June 21, 1932. J. BURNS 1,863,743
MEAT HANGING METHOD
Filed Nov. 1, 1930 2 Sheets-Sheet 2

Joseph Burns
INVENTOR.

BY George W. Johns
ATTORNEY

WITNESS-

Patented June 21, 1932

1,863,743

UNITED STATES PATENT OFFICE

JOSEPH BURNS, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

MEAT HANGING METHOD

Application filed November 1, 1930. Serial No. 492,642.

My invention relates to methods and means for hanging wholesale cuts of meat, especially for transportation. It is common practice to cut up carcass meat, especially beef, into sub-divisions such as rounds, chucks, forequarters, etc., in order that the peculiar demands of the several sections of the country may be satisfied, there being a greater demand for certain cuts of meat in some sections than in others.

In shipping fresh meat by refrigerator car, it is necessary, of course, to so arrange the meat within the car as to provide for a maximum circulation of air in order to avoid souring of the meat. Numerous hooks and hangers of various types have been proposed from time to time but have been found objectionable in practice.

The usual single prong hook results in tearing large holes in the product due to the pendulum-like swinging induced by the motion of the car. The tearing loose of the hook in transportation often results in the products falling to the floor of the car. When very many pieces fall, the product piles up and it is not only in danger of souring but by reason of the motion of the car is cast about over the floor, bruising and otherwise deteriorating the product. This is especially true in the regular shipments of beef cuts by the middle western packers to the eastern consuming centers. A fixed rigid hook of either one or more prongs is not satisfactory because the meat tends to swing and tear loose from the hook. Where a single prong hook is used but is permitted to swing freely, the meat tends to swing to a greater arc than the hook, resulting in damage and disadvantages I have hereinbefore suggested.

My invention will be more readily understood by reference to the accompanying drawings, which form a part of this specification, and in which similar numerals of reference in the several figures indicate similar parts.

Figure 1:
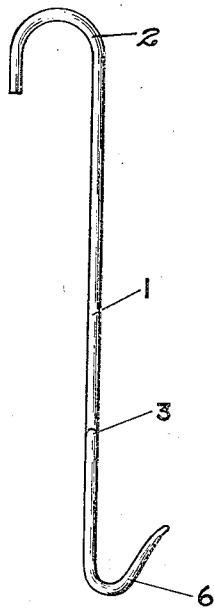
Figure 2:
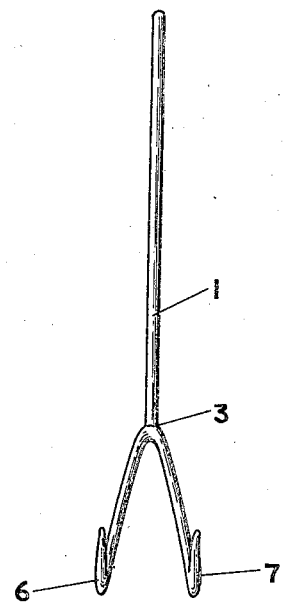
Figure 3:
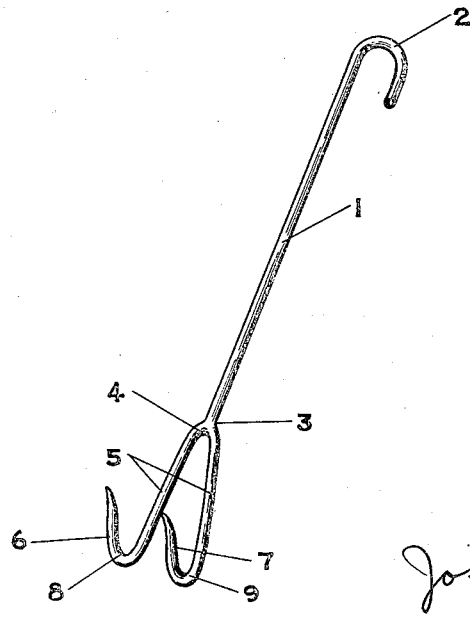
Figure 4:
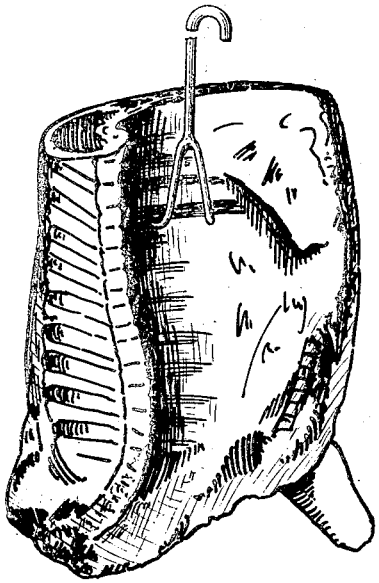
Figure 5:
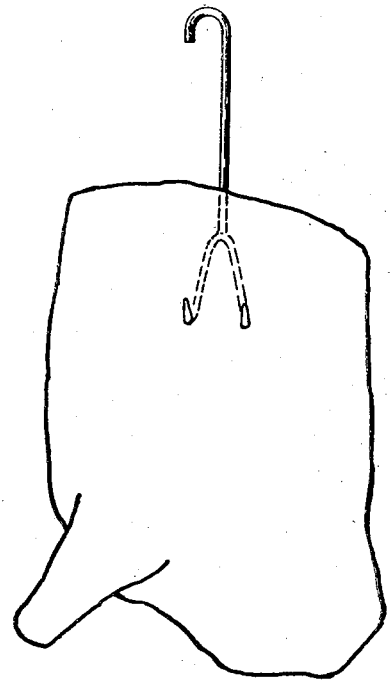

Figure 1 is a side view of the hook.
Figure 2 is a front view of the hook.
Figure 3 is a perspective view of the hook.
Figure 4 is a perspective view showing the hook inserted in a forequarter of beef.
Figure 5 is a front view showing the points of the hook protruding from the surface, the concealed portions of the device being shown in dotted lines.

The device shown in the drawings which is a preferred form for carrying out the method of this invention is extremely simple and inexpensive, consisting essentially of the shaft 1 bent at the top to provide hook 2, enjoined by welding or other appropriate means at 3 to a double prong, preferably made in one piece, presenting in the front or rear view an inverted V joined at its apex 4 to shaft 1, the two ends of which are bent off into planes substantially at right angles to the plane of the legs of the inverted V 5. These prongs 6 and 7 are disposed in parallel planes which are parallel to the plane of hook 2. In use the hook 2 is placed over a rafter or rail, or other appropriate fixed point of suspension, and the points of prongs 6 and 7 are inserted in the product to be suspended such that the weight of the meat is supported at 8 and 9. It will be noted that the position of the two prongs prevents any pivoting at the points of suspension, the pivot of the typical pendulum-like swing being at 2 resulting in a minimum of damage to the product.

Although my invention is herein specifically exemplified, it is to be understood that changes may be made in the design of the device and the method of using it without departing from the spirit of my invention as described in the claim which follows.

I claim:

The method of hanging wholesale cuts of meat in a vehicle for transportation which consists in securing the meat to an overhead support, permitting the meat to have a horizontal pivotal swinging movement at the point of support and connecting the meat at spaced points to the support to prevent relative horizontal movement between the meat and supporting means to prevent tearing of the meat.

Signed at Chicago, Illinois this 30 day of October, A. D. 1930.

JOSEPH BURNS.